Dec. 12, 1961 J. KRYGOWSKI 3,012,641
STUD-STAKING ARRANGEMENT
Filed Sept. 1, 1959
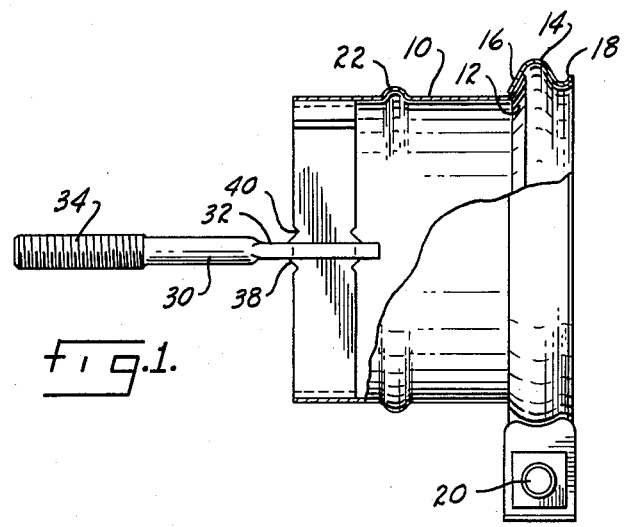
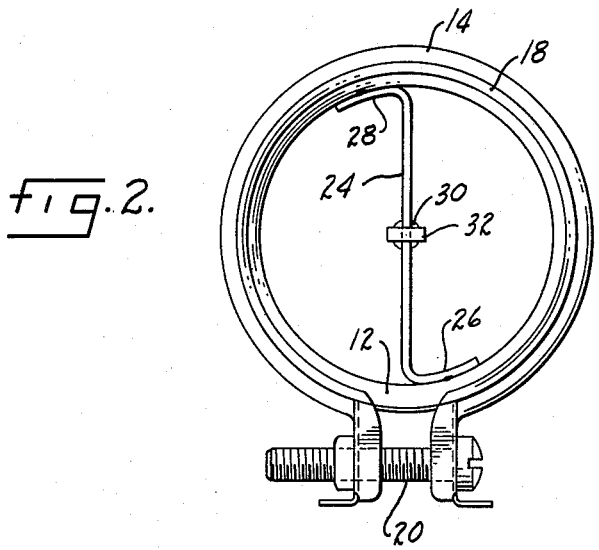
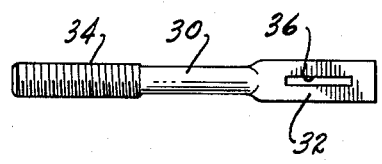
INVENTOR.
Joseph Krygowski,
BY Parker & Carter
Attorneys.

United States Patent Office 3,012,641
Patented Dec. 12, 1961

3,012,641
STUD-STAKING ARRANGEMENT
Joseph Krygowski, Posen, Ill., assignor to Novo Industrial Corporation, a corporation of New York
Filed Sept. 1, 1959, Ser. No. 837,399
2 Claims. (Cl. 189—36)

This invention relates to a fastening arrangement or stud-staking arrangement, and has particular application in the securing of an air cleaner to the carburetor of a vehicle.

In the conventional air cleaner there is a stud which projects out from the air cleaner and is used as a means to fasten the cleaner to the carburetor of an automobile or other vehicle. This stud is conventionally welded to a strap or the like which in turn is welded at opposite ends to the sleeve forming a portion of the air cleaner. As an air cleaner is conventionally secured to an engine carburetor there will be continuous vibrations transferred from the engine to the carburetor and to the welded joints holding the stud in the air cleaner. I have found, that after prolonged use, the weld holding the stud to the air cleaner will loosen or break off with the air cleaner than falling off the engine. I have eliminated such a weld in the invention shown and described herein. I have provided a means for fastening or securing a stud to a brace, such as that used in an air cleaner, without a welded joint.

One purpose of my invention is a stud-staking arrangement, suitable for use in securing an air cleaner to a carburetor.

Another purpose of the invention is a fastening arrangement, having a wide variety of uses, which securely fastens two members together without the use of welding, soldering or other similar connecting means.

Another purpose is a fastening arrangement which may be assembled with a minimum of effort and in a minimum amount of time.

Another purpose is a stud-staking arrangement, suitable for use in securing an air cleaner to a carburetor, which can be provided at a very low cost.

Another purpose is a method of fastening two members together in which the areas of one member, immediately adjacent the other member, are forced or crimped to provide a secure connection.

Other purposes will appear in the ensuing specification, claims and drawings.

The invention is illustrated diagrammatically in the following drawings wherein:

FIGURE 1 is a partially cut-away side view of a sleeve on which is mounted my improved fastening arrangement.

FIGURE 2 is an end view, from the right end, of the sleeve and fastening arrangement of FIGURE 1, and FIGURE 3 is a plan view of a stud such as used herein.

A generally cylindrical sleeve 10, which may be the sleeve used to form the bottom portion of an air cleaner, or it may be otherwise, has a generally out turned lip or flange 12 at one end thereof. A suitable circular bracket 14 has a portion 16 which fits against the lip or flange 12 and a somewhat similar portion 18 which may be secured within an air cleaner, if that is the use of the sleeve shown herein. The bracket 14 has a bolt arrangement 20 which secures the opposite ends of the bracket and provides means for tightening the bracket so that it may secure the sleeve to another cylindrical member. The sleeve 10 has a generally intermediate rib 22 which may act as an abutment or the like when the sleeve is secured within an air cleaner.

A brace member or support member 24 is secured at the opposite end of the sleeve 10. The brace has opposite end portions 26 and 28 bent over so as to have generally the same curvature as the interior of the sleeve. The portions 26 and 28 are in the preferred form spot welded to the sleeve. A suitable stud 30 has a generally flattened portion 32 at one end thereof and a threaded portion 34 at the opposite end. The flattened portion 32 has a slot 36 which is generally of the size and shape of the brace member 24 and in particular the intermediate or center section of the brace. The brace member is received within the slot so that the stud 30 may be used to fasten the sleeve, and any structure secured thereto, for example, an air cleaner, to a carburetor or other assembly. As shown in the drawings the slot 36 is generally rectangular and that section of the brace 24 within the slot is also rectangular. It should be understood however that this particular shape is not essential, nor is it essential that the brace be rectangular throughout as there need be only a center portion formed and adapted to be received within the slot. It is not necessary to flatten that portion of the stud having the slot, as indicated at 32, as it is also satisfactory to have the shank or stud 30 take the same shape throughout.

In my improved fastening connection, I may crimp, or push or otherwise force areas or portions 38 of the brace immediately adjacent the flattened portion 32 of the shank or stud so that there are portions or areas of the brace which are forced up against the stud and so hold it in position. I use this type of arrangement in preference to welding which has been used on many types of connections heretofore. In order to form such an arrangement I may strike the metal forming the brace at a point slightly removed from the stud so as to form a small groove, indicated at 40, which in turn forces or pushes a portion of the brace up against the stud. I may so force the brace by any suitable type of tool. I have performed this striking operation or crimping on both sides of the shank or stud and at both the top and the bottom or the smaller sides of the brace. By so doing I provide a strong connection for the shank which will not be jarred loose by motor vibrations.

The use, operation and function of the invention are as follows:

I have shown herein a stud-staking or fastening arrangement which is particularly suitable for use in securing an air cleaner to the carburetor of an engine. However, it should be realized, that the particular arrangement of fastening a shank or stud to a brace or second member has many other uses. I, therefore, do not wish to be limited to merely the use in connection with fastening air cleaners to carburetors. The invention comprises essentially two members, which are placed in angular relationship and in the preferred form placed at right angles to each other. One of these members has a slot formed therein so that the second member may be received within the first member. Once the members have been suitably positioned I may strike or otherwise force the areas or portions of the brace immediately adjacent the shank or stud, but outside of the slot, until portions of these areas are moved up against the member having the slot. By so doing I provide a firm strong connection between the two members. I have found it preferable to crimp, or push or otherwise force the metal on both sides of the stud and at both the top and bottom of the brace or other member. This provides a secure connection.

As shown in the drawings, the invention has been adapted to secure an air cleaner to a carburetor. For this reason the stud has a threaded portion 34 which is commonly threaded into a suitable assembly on the carburetor. The opposite end of the sleeve 10 is secured usually by means of the brace or bracket 14 to a portion of an air cleaner assembly.

Although I have shown the preferred form in the drawings, there are many modifications, substitutions and alterations thereto which are within the scope of the invention. For example, the shank or stud 30 need not be round but may be square, triangular or any other shape. In addition it need not have a flattened portion, but the shank may be the same shape throughout. In addition the brace and the slot containing the brace need not be rectangular but may be square, or slightly oval. The particular shape of the members is not important. The invention should, therefore, only be limited by the scope of the following claims.

I claim:

1. A fastening arrangement including a sleeve, a brace secured at its opposite ends within said sleeve, a shank, a somewhat rectangular slot intermediate the ends of said shank, said brace having a cross section generally similar in size and shape to said slot, said brace cross section being snugly positioned in said slot to form a relatively rigid and generally perpendicular connection between said shank and brace, the area of said brace adjacent said shank being generally rectangular and having two relatively long sides and two relatively short sides, the short sides of said brace, immediately adjacent but outside of said shank, being crimped toward said shank to secure said brace to said shank.

2. The structure of claim 1 further characterized in that all four short sides of said brace adjacent said shank are crimped toward said shank.

References Cited in the file of this patent

UNITED STATES PATENTS

| | | |
|---|---|---|
| 687,660 | Schultz | Nov. 26, 1901 |
| 1,132,021 | Mark et al. | Mar. 16, 1915 |
| 2,041,051 | Dallas | May 19, 1936 |
| 2,241,952 | Lachman | May 13, 1941 |
| 2,689,630 | Drury | Sept. 21, 1954 |